(12) United States Patent
Teng et al.

(10) Patent No.: US 12,337,228 B2
(45) Date of Patent: Jun. 24, 2025

(54) HANDLE TRIGGER CONTROL APPARATUS AND HANDLE

(71) Applicant: GOERTEK INC., Shandong (CN)

(72) Inventors: Xuefang Teng, Shandong (CN); Yanlong Liu, Shandong (CN); Lin Geng, Shandong (CN); Dong Liang, Shandong (CN); Xing Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 321 days.

(21) Appl. No.: 17/905,051

(22) PCT Filed: Oct. 30, 2020

(86) PCT No.: PCT/CN2020/125042
§ 371 (c)(1),
(2) Date: Aug. 25, 2022

(87) PCT Pub. No.: WO2021/169360
PCT Pub. Date: Sep. 2, 2021

(65) Prior Publication Data
US 2023/0149804 A1 May 18, 2023

(30) Foreign Application Priority Data
Feb. 27, 2020 (CN) .......................... 202010125146.4

(51) Int. Cl.
*A63F 13/22* (2014.01)
*A63F 13/24* (2014.01)
*A63F 13/285* (2014.01)

(52) U.S. Cl.
CPC .............. *A63F 13/22* (2014.09); *A63F 13/24* (2014.09); *A63F 13/285* (2014.09); *A63F 2300/1037* (2013.01); *A63F 2300/1043* (2013.01)

(58) Field of Classification Search
CPC ......... G06T 7/0012; G06T 2207/10088; G06T 2207/30016; G06T 2207/30096;
(Continued)

(56) References Cited

U.S. PATENT DOCUMENTS 8,894,491 B2 * 11/2014 Grant .................... A63F 13/235
463/36
2016/0175711 A1 * 6/2016 Billington ................ G08B 6/00
340/407.2
2019/0126143 A1 5/2019 Schmitz

FOREIGN PATENT DOCUMENTS

CN 206355570 U 7/2017
CN 107551538 A 1/2018
(Continued)

*Primary Examiner* — Michael C Grant
(74) *Attorney, Agent, or Firm* — LKGlobal | Lorenz & Kopf, LLP

(57) ABSTRACT

A handle trigger control apparatus and a handle having the handle trigger control apparatus are disclosed. The handle trigger control apparatus comprises a trigger bracket, and further comprises: a trigger that is movably disposed on the trigger bracket and is provided thereon with a trigger magnet; a bracket magnet that is movable and can be fixedly provided on the trigger bracket; and a control device configured to control the bracket magnet to approach or go away from the trigger magnet to adjust an action distance between the trigger magnet and the bracket magnet.

16 Claims, 3 Drawing Sheets

(58) Field of Classification Search
CPC ........ G06T 2207/30168; A61B 5/0042; A61B 5/055; A61B 5/4088; A61B 5/4842; G01R 33/5608
USPC .......................................................... 463/37
See application file for complete search history.

(56) References Cited

FOREIGN PATENT DOCUMENTS

| | | |
|---|---|---|
| CN | 107743411 A | 2/2018 |
| CN | 207591273 U | 7/2018 |
| CN | 208799753 U | 4/2019 |
| CN | 111346366 A | 6/2020 |
| JP | H10232737 A | 9/1998 |

* cited by examiner

HANDLE TRIGGER CONTROL APPARATUS AND HANDLE

CROSS-REFERENCE TO RELATED APPLICATION

This application is a U.S. National-Stage entry under 35 U.S.C. § 371 based on International Application No. PCT/CN2020/125042, filed Oct. 30, 2020 which was published under PCT Article 21(2) and which claims priority to Chinese Application No. 202010125146.4, filed Feb. 27, 2020, which are all hereby incorporated herein in their entirety by reference.

TECHNICAL FIELD

This application pertains to the technical field of control terminals, more specifically, to a handle trigger control apparatus. In addition, the present disclosure also relates to a handle comprising the handle trigger control apparatus.

BACKGROUND

With the progress of society and the development of network technology, more and more games have been developed and favored by people. As a game device, the game handle has become an essential operating device for players.

The main function of ordinary game handles is to realize the operation functions of the game, such as controlling direction, marching, jumping, weapon launching, etc. However, the most important thing of the game is to provide players an immersive game experience. In the traditional solutions, the trigger of the game handle only relies on the spiral torsion spring to provide an elastic restoring force, and the amplitude of force feedback cannot be changed and controlled, so the user experience of the game is poor.

In sum, how to provide users a rich operation experience of trigger is an urgent problem for those skilled in the art. In addition, other objects, desirable features and characteristics will become apparent from the subsequent summary and detailed description, and the appended claims, taken in conjunction with the accompanying drawings and this background.

SUMMARY

In view of this, an object of the present disclosure is to provide a handle trigger control apparatus, which can realize the control of the trigger, make the trigger have different use effects, and improve the user experience.

Another object of the present disclosure is to provide a handle comprising the handle trigger control apparatus.

In order to achieve the above objects, the present disclosure provides the following technical solutions.

A handle trigger control apparatus, comprising a trigger bracket, wherein the handle trigger control apparatus further comprises:
  a trigger that is movably disposed on the trigger bracket and is provided thereon with a trigger magnet;
  a bracket magnet that is movable and can be fixedly provided on the trigger bracket; and
  a control device configured to control the bracket magnet to approach or go away from the trigger magnet to adjust an action distance between the trigger magnet and the bracket magnet.

Preferably, the bracket magnet is directly opposite to the trigger magnet that is in a fully pressed state, and a facing area of the bracket magnet and the trigger magnet in the fully pressed state remains unchanged when the control device controls the bracket magnet to approach or go away from the trigger magnet.

Preferably, magnetic poles of opposite sides of the bracket magnet and the trigger magnet are same, and the bracket magnet is located in a moving direction of pressing the trigger magnet.

Preferably, the trigger is provided thereon with a groove, and the trigger magnet is disposed in the groove.

Preferably, the trigger is connected with the trigger bracket via an elastic member, and the elastic member is configured to drive the trigger in the pressed state to return its original position.

Preferably, the elastic member is a position restoring spring, one end of the position restoring spring is connected with the trigger bracket, and the other end of the position restoring spring is connected with the trigger.

Preferably, the trigger is hinged to the trigger bracket via a hinge shaft.

Preferably, an area of the trigger magnet is same as that of the bracket magnet.

Preferably, the control device is provided with a signal receiving device for receiving an adjustment command for the bracket magnet; or
  the control device is preset with an adjustment command for the bracket magnet.

A handle comprises a trigger control device, which is the handle trigger control apparatus as described in any of the above items.

The control device of the present disclosure adjusts the distance between the two magnets by moving the bracket magnet to provide different magnetic forces for the trigger, and the changeable magnetic forces provide different trigger feedback forces for the user, so as to provide different tactile feelings for the user based on different game environments.

The present disclosure controls the force by changing the distance between the two magnets, which can change the distance between the two magnets based on different game environments and game settings, so that users can experience different tactile shocks when pulling the trigger, and experience higher-level fun brought by the game during the change of trigger feedback force.

The present disclosure also provides a handle comprising the handle trigger control apparatus.

BRIEF DESCRIPTION OF DRAWINGS

The present invention will hereinafter be described in conjunction with the following drawing figures, wherein like numerals denote like elements, and:

In FIGS. 1 to 3:
1: trigger; 2: bracket magnet; 3: trigger magnet.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in the embodiments of the present disclosure will be clearly and completely described below in conjunction with the drawings and specific embodiments. Obviously, the embodiments described are only part of, rather than all of, the embodiments of the present disclosure. Based on the embodiments in the present disclosure, all other embodiments obtained by a person of ordinary skill in the art without paying creative work shall fall within the protection scope of the present disclosure.

The core of the present disclosure is to provide a handle trigger control apparatus, which can realize the control of the trigger, make the trigger have different use effects, and improve the user's use experience.

Another core of the present disclosure is to provide a handle comprising the handle trigger control apparatus.

Figure 1:
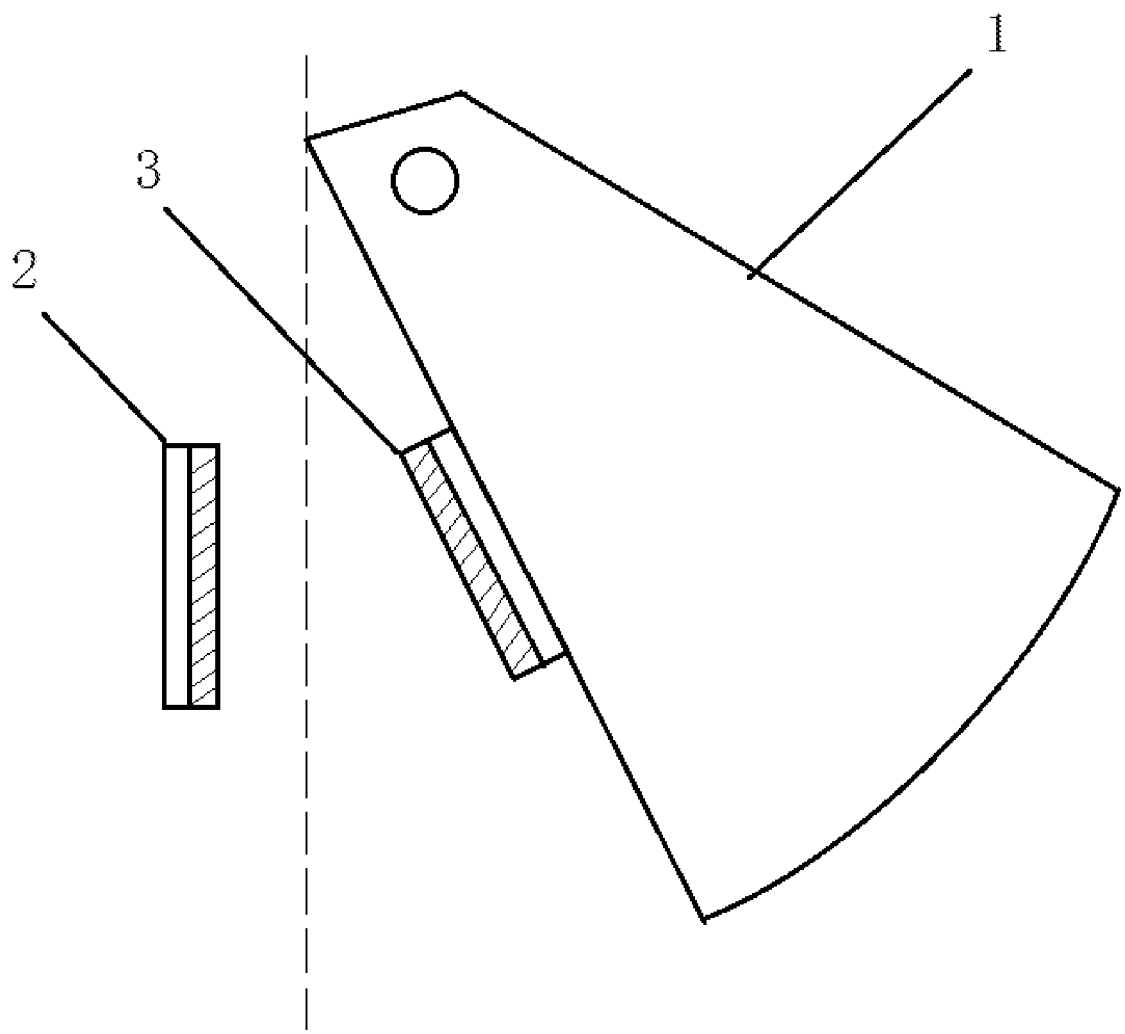
FIG. 1 is a schematic view of a handle trigger control apparatus according to the present disclosure.
Figure 2:
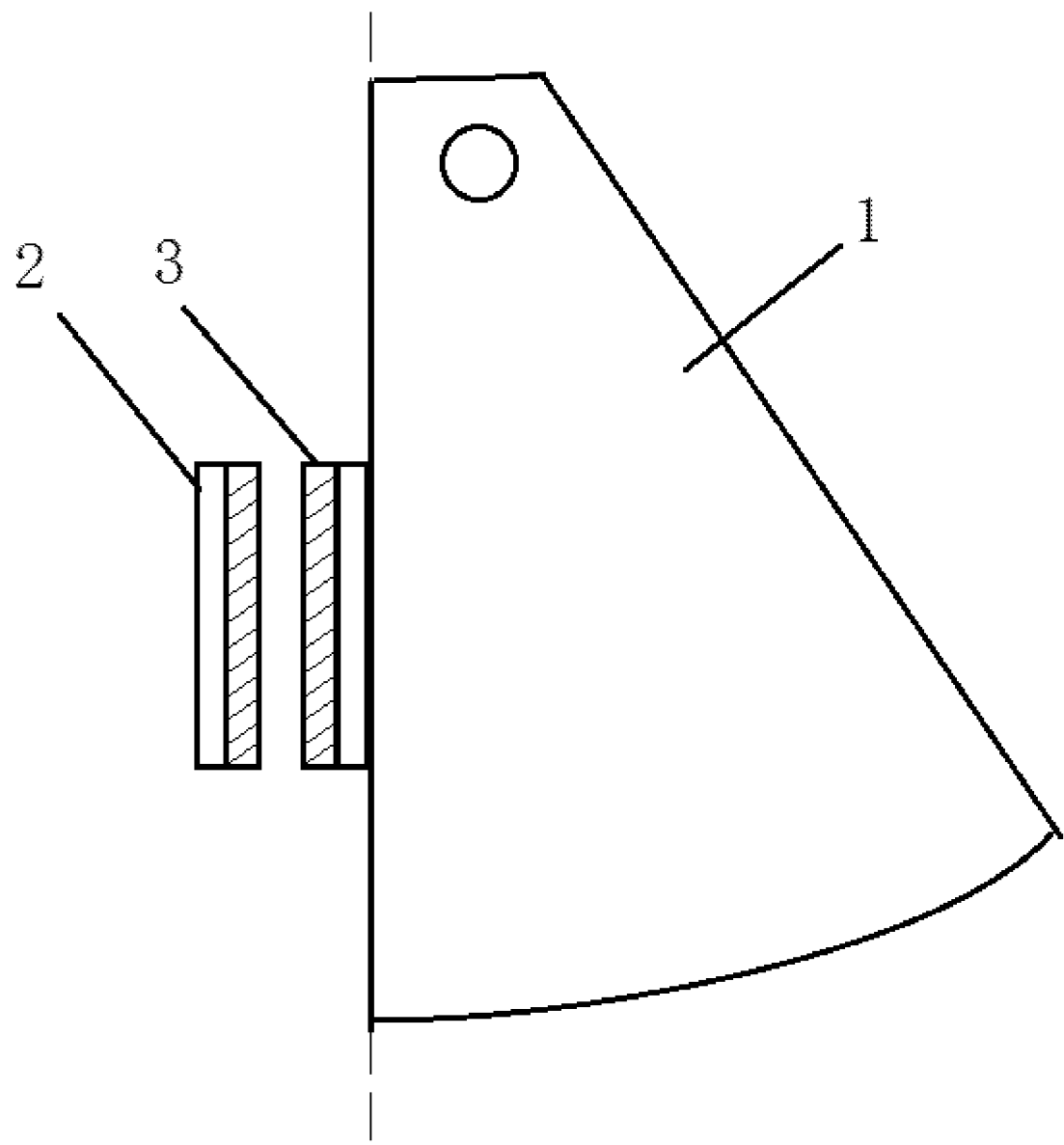
FIG. 2 is a schematic view of a bracket magnet at a position close to a trigger magnet.
Figure 3:
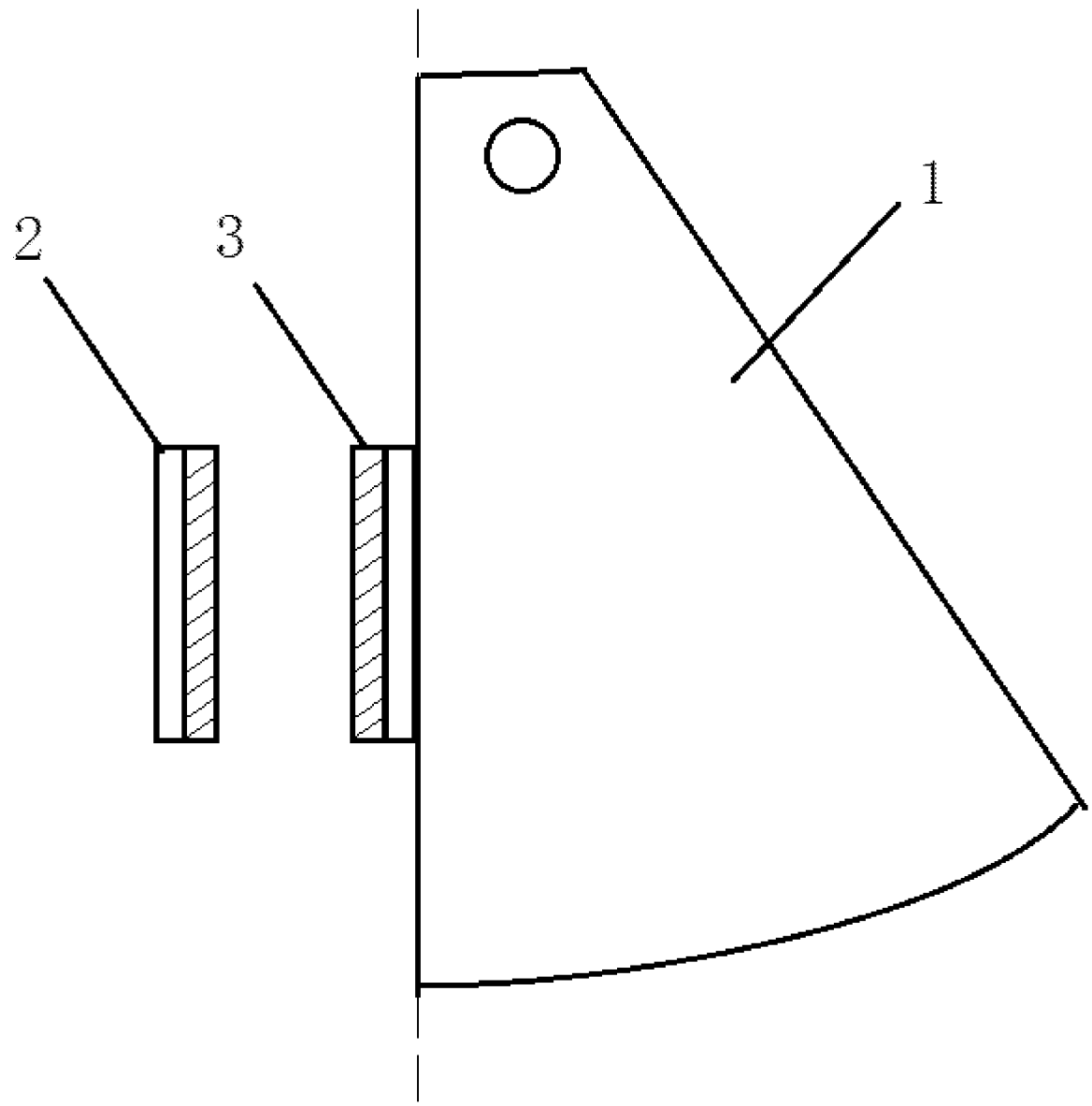
FIG. 3 is a schematic view of a bracket magnet at a position away from a trigger magnet.

Please refer to FIGS. 1 to 3. FIG. 1 is a schematic view of a handle trigger control apparatus according to the present disclosure; FIG. 2 is a schematic view of a bracket magnet at a position close to a trigger magnet; FIG. 3 is a schematic view of a bracket magnet at a position away from a trigger magnet.

The handle trigger control apparatus according to the present disclosure is mainly used on the game handle or the handle of somatosensory interactive device to realize the control and adjustment of the use experience of the trigger. The handle trigger control apparatus comprises a trigger bracket. The handle trigger control apparatus further comprises:

a trigger 1 that is movably disposed on the trigger bracket and is provided thereon with a trigger magnet 3;

a bracket magnet 2 that is movable and can be fixedly provided on the trigger bracket; and a control device configured to control the bracket magnet 2 to approach or go away from the trigger magnet 3 to adjust an action distance between the trigger magnet 3 and the bracket magnet 2.

The trigger bracket is usually provided in the handle and is configured to support the trigger 1. The trigger 1 can move (rotate or translate) relative to the trigger bracket. In the present disclosure, the trigger bracket may be fixed in the handle, or may be movable, at mean time be fixed installed in the handle.

The trigger 1 is movably arranged on the trigger bracket. When pressed by an external force, the trigger 1 can move relative to the trigger bracket. The trigger magnet 3 is fixedly provided on the trigger 1. The trigger magnet 3 has magnetism and can maintain magnetism.

The bracket magnet 2 is disposed on the trigger bracket, and the bracket magnet 2 and the trigger magnet 3 have a magnetic relationship of mutual attraction or mutual repulsion.

The control device is connected with the bracket magnet 2 to control the movement of the bracket magnet so that the bracket magnet 2 can approach or go away from the trigger magnet 3. It should be noted that "approach" or "go away" refers to comparing with the same state as the trigger, for example, comparing with when the trigger 1 is not pressed by an external force, or comparing with when the trigger 1 is fully pressed by a force.

There is an attractive or repulsive force between the trigger magnet 3 and the bracket magnet 2. The effective distance between them is the action distance for the magnet. The control device is configured to adjust the action distance between the bracket magnet 2 and the trigger magnet 3.

Taking two repulsive magnets as an example, when the control device adjusts the bracket magnet 2 to be closer to the trigger magnet 3, the repulsion force between the two will increase within a certain range, and the force acting on the trigger magnet 3 will increase. For the trigger that has been pressed and the force has been removed, the trigger 1 will be return to its original position at a faster speed and with a greater force due to the increase of the repulsion force, thereby providing the operator's hand a more obvious rebound force.

When actually used by the user, based on the needs of the game environment, the trigger of the game handle is pulled and pressed down. Due to the different needs of gun battle and artillery battle, in order to give the user a more realistic tactile experience, the control device moves the bracket magnet 2 and provides different magnetic forces for trigger 1 by adjusting the distance between the two magnets. The changeable magnetic force provides different trigger feedback forces for the user. Thus, it provides users with different tactile feelings based on different game environments.

The present disclosure controls the forces by changing the distance between the two magnets, and can change the distance between the two magnets based on different game environments and game settings, so that users can experience different tactile shocks when pulling the trigger, and experience higher-level fun brought by the game during the change of trigger feedback force.

On the basis of the above embodiment, the bracket magnet 2 is disposed directly opposite to the trigger magnet 3 in the fully pressed state, and a facing area of the bracket magnet 2 and the trigger magnet 3 that is in a fully pressed state remains unchanged when the control device controls the bracket magnet 2 to approach or go away from the trigger magnet 3.

Please refer to FIG. 2 and FIG. 3, the trigger 1 has been pressed from the state of FIG. 1 to the position of FIG. 2 or FIG. 3. At this moment, the bracket magnet 2 and the trigger magnet 3 are directly opposite to each other. FIG. 2 is a schematic view of the bracket magnet at a position close to the trigger magnet, and FIG. 3 is a schematic view of the bracket magnet at a position far away from the trigger magnet. It can be seen that in FIGS. 2 and 3, the bracket magnet 2 is located relatively close to and far away from the trigger magnet 3, and the two magnets are in a directly opposite state, that is, in a parallel and non-misaligned state, in both cases.

It should be noted that the function of keeping the facing area unchanged is to make the change of the force between the two magnets completely determined by the distance between them, not affected by the angle and the corresponding area. It can be seen from the distribution of magnetic induction line around the magnet, within a certain range, the closer the distance is, the greater the action force is, and the farther the distance is, the smaller the action force is.

Optionally, in the present disclosure, the magnetic force may also be changed by changing the facing area between the two magnets, which will not be described in detail here.

On the basis of the above embodiments, the magnetic poles of the opposite sides of the bracket magnet 2 and the trigger magnet 3 are the same, and the bracket magnet 2 is located in a moving direction of pressing the trigger magnet 3.

Please refer to FIG. 1, the opposite sides of the bracket magnet 2 and the trigger magnet 3 have the same magnetic pole, and a repulsive force is generated between them. In order to provide the operator a changeable rebound force of the trigger 1, preferably, the bracket magnet 2 is located in a moving direction of pressing the trigger magnet 3.

Alternatively, they may also take advantage of the mutual attraction between the opposite magnetic poles. Of course, it is necessary to change the position of the bracket magnet 2 so that it is disposed in a moving direction of the trigger magnet 3 for position restoring.

On the basis of any of the above embodiments, the trigger 1 is provided with a groove, and the trigger magnet 3 is disposed in the groove.

The groove provided on the trigger 1 may have a size exactly same as that of the trigger magnet 3, so as to ensure stable installation. Alternatively, it may be positioned and installed by other fixing devices.

Optionally, the trigger magnet 3 may also be directly provided on a flat surface of trigger 1.

Optionally, the trigger 1 is provided thereon with a bonding device for bonding the trigger magnet 3.

On the basis of any of the above embodiments, the trigger 1 is connected with the trigger bracket via an elastic member, which is configured to drive the trigger in a pressed state to return to its original position.

In the prior art, an elastic member is often used to connect the trigger 1 and the handle casing, etc., so as to return the trigger 1 to its original position in a free state. In the present disclosure, an elastic member may be not necessary, and the position restoring can be realized only by using the bracket magnet 2 and trigger magnet 3 whose force is adjustable. Of course, on the basis of any of the above embodiments, the addition of the elastic member can not only ensure the position restoring of trigger 1, but also have the guiding effect of the position restoring direction of the trigger 1.

On the basis of the above embodiment, the elastic member is a position restoring spring, one end of the position restoring spring is connected to the trigger bracket, and the other end of the position restoring spring is connected to the trigger 1.

One end of the position restoring spring is fixed on the trigger bracket, and the other end of the position restoring spring is fixedly connected to the trigger 1. Optionally, a middle position of the position restoring spring may also be fixed on the trigger bracket.

The trigger 1 may be installed on the trigger bracket in various forms. It may also be directly installed at a fixed position in the handle. In a reliable embodiment, the trigger 1 is hinged to the trigger bracket through a hinge shaft. When the trigger 1 receives a pressing force, it can rotate around the hinge shaft. When the pressing force is cancelled, the trigger 1 receives the above magnetic force and rotates reversely around the hinge shaft to return to its original position.

Please refer to FIG. 2 and FIG. 3. In a specific embodiment, the area of the trigger magnet is same as that of the bracket magnet. If they have the same area, it is easier to determine the opposite position and avoid the change of magnetic force caused by position offset during assembly.

In any of the above embodiments, the control device may specifically be a motor control device comprising a controller, a motor connected to the controller and a lead screw connected to an output end of the motor. The controller controls the motor to rotate forward or reverse, so as to drive the lead screw to move. The bracket magnet 2 is disposed at the end of the lead screw and moves in a straight line under the drive of the motor, so as to achieve relatively approaching or going away. It should be noted that the moving direction of the lead screw is perpendicular to the length direction of the bracket magnet 2.

Optionally, the lead screw may also be replaced by a gear rack device, in which the output end of the motor is connected with the gear, the rack is meshed with the gear, and the end of the rack is connected with the bracket magnet 2.

The above embodiment only provides two forms of relatively stable control devices. Of course, other methods in the prior art may also be used to realize the bracket magnet 2.

On the basis of any one of the above embodiments, the control device is provided with a signal receiving device for receiving an adjustment command for the bracket magnet 2. Alternatively, the control device is preset with an adjustment command for the bracket magnet 2.

The handle needs to realize different trigger feedback experiences according to the game content or the current scene. Therefore, the control device needs to adjust the bracket magnet 2 according to the current game content or the current scene. The control device may obtain the required state in real time; alternatively, the corresponding control state is stored in the control device in advance. In other words, the control device needs to be equipped with a corresponding signal receiving device to receive a signal (including an adjustment command) in real time and adjust the bracket magnet 2. Of course, the control device may also be provided with a storage device, that is, store a certain adjustment commands in advance.

In a specific embodiment according to the present disclosure, on the basis of the spring torque provided by the existing trigger 1, a repulsion force of magnet is added, and the repulsion force of the magnet is controlled by changing the distance between the trigger magnet 3 and the bracket magnet 2, thereby providing users different force feedback game sense. A groove is provided on the inner side of casing of the trigger 1 for installing the trigger magnet 3. A movable bracket magnet 2 is installed at the corresponding position of the trigger magnet 3, and the bracket magnet 2 can move relative to the trigger bracket. By moving the bracket magnet 2, the action distance between the two magnets is changed, so as to change the repulsion force of magnet, as shown in FIG. 2. At the same time, a shaft is installed inside the trigger to fix the position restoring spring. One side of the position restoring spring is fixed on the trigger, and the other side of the position restoring spring is fixed on the bracket, so as to provide the position restoring elastic force for the trigger.

In addition to the main structure of the handle trigger control apparatus provided in any of the above embodiments, please refer to the prior art for the structure of other parts of the handle trigger control apparatus, which will not be repeated herein.

The present disclosure also provides a handle comprising a handle trigger control apparatus. The handle comprises a handle casing and a main board and other structures built in the handle casing. A handle trigger control apparatus is provided in the handle casing. Please refer to the prior art for the structure of other parts of the handle, which will not be repeated here.

The embodiments in this specification are described in a progressive manner. Each embodiment focuses on the differences from other embodiments. The same and similar parts of the embodiments can be referred to each other.

The above description of the disclosed embodiments enables those skilled in the art to realize or use the present disclosure. Various modifications to these embodiments will be apparent to those skilled in the art, and the general principles defined herein can be implemented in other embodiments without departing from the spirit or scope of the present disclosure. Therefore, the present disclosure will not be limited to the embodiments shown herein, but will conform to the widest scope consistent with the principles and novel features disclosed herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A handle trigger control apparatus, comprising a trigger bracket, wherein the handle trigger control apparatus further comprises:
    a trigger (1) that is movably disposed on the trigger bracket and is provided thereon with a trigger magnet (3);
    a bracket magnet (2) that is movable and can be fixedly provided on the trigger bracket; and
    a control device configured to control the bracket magnet (2) to approach or go away from the trigger magnet (3) to adjust an action distance between the trigger magnet (3) and the bracket magnet (2),
    wherein the bracket magnet (2) is directly opposite to the trigger magnet (3), and a facing area of the bracket magnet (2) and the trigger magnet (3) remains unchanged when the bracket magnet (2) approaches or goes away from the trigger magnet (3).

2. The handle trigger control apparatus according to claim 1, wherein magnetic poles of opposite sides of the bracket magnet (2) and the trigger magnet (3) are same, and the bracket magnet (2) is located in a moving direction of pressing the trigger magnet (3).

3. The handle trigger control apparatus according to claim 1, wherein the trigger (1) is provided thereon with a groove, and the trigger magnet (3) is disposed in the groove.

4. The handle trigger control apparatus according to claim 1, wherein the trigger (1) is connected with the trigger bracket via an elastic member, and the elastic member is configured to drive the trigger in the pressed state to return its Original position.

5. The handle trigger control apparatus according to claim 4, wherein the elastic member is a position restoring spring, one end of the position restoring spring is connected with the trigger bracket, and the other end of the position restoring spring is connected with the trigger.

6. The handle trigger control apparatus according to claim 4, wherein the trigger (1) is hinged to the trigger bracket via a hinge shaft.

7. The handle trigger control apparatus according to claim 1, wherein an area of the trigger magnet (3) is same as that of the bracket magnet (1).

8. The handle trigger control apparatus according to claim 1, wherein the control device is provided with a signal receiving device configured to receive an adjustment command for the bracket magnet (2); or
    the control device is preset with an adjustment command for the bracket magnet (2) in advance.

9. A handle comprising a handle trigger control apparatus according to claim 1.

10. The handle according to claim 9, wherein magnetic poles of opposite sides of the bracket magnet (2) and the trigger magnet (3) are same, and the bracket magnet (2) is located in a moving direction of pressing the trigger magnet (3).

11. The handle according to claim 9, wherein the trigger (1) is provided thereon with a groove, and the trigger magnet (3) is disposed in the groove.

12. The handle according to claim 9, wherein the trigger (1) is connected with the trigger bracket via an elastic member, and the elastic member is configured to drive the trigger in the pressed state to return its Original position.

13. The handle according to claim 12, wherein the elastic member is a position restoring spring, one end of the position restoring spring is connected with the trigger bracket, and the other end of the position restoring spring is connected with the trigger.

14. The handle according to claim 12, wherein the trigger (1) is hinged to the trigger bracket via a hinge shaft.

15. The handle according to claim 9, wherein an area of the trigger magnet (3) is same as that of the bracket magnet (1).

16. The handle according to claim 9, wherein the control device is provided with a signal receiving device configured to receive an adjustment command for the bracket magnet (2); or
    the control device is preset with an adjustment command for the bracket magnet (2) in advance.

* * * * *